United States Patent
Langley

[15] 3,705,261
[45] Dec. 5, 1972

[54] SCANNING SYSTEM FOR YIELDING A THREE-DIMENSIONAL DISPLAY

[72] Inventor: Lawrence W. Langley, Severna Park, Md.

[73] Assignee: Symbionics, Inc., Annapolis, Md.

[22] Filed: April 9, 1970

[21] Appl. No.: 26,846

[52] U.S. Cl. .................................................. 178/6.5
[51] Int. Cl. ............................................... H04n 7/02
[58] Field of Search .......... 178/6.5, 6.8; 250/217 CR; 128/24 A; 340/5 I; 350/138

[56] References Cited

UNITED STATES PATENTS

| | | | |
|---|---|---|---|
| 3,495,891 | 2/1970 | Lee ........................... | 350/131 |
| 2,883,907 | 4/1959 | Silent ........................ | 350/138 |
| 3,067,281 | 12/1962 | La Pierre et al. ........... | 178/6.8 |
| 3,251,933 | 5/1966 | Beste ........................ | 178/6.5 |
| 3,323,512 | 6/1967 | Clynes ...................... | 128/24 A |

Primary Examiner—Robert L. Griffin
Assistant Examiner—Barry L. Leibowitz
Attorney—Birch, Swindler, McKie & Beckett

[57] ABSTRACT

A system for scanning an object and obtaining a three-dimensional display of the features of the object is described. Internal discontinuities within the scanned object can be detected and visually displayed. The system includes a transmitting element which transmits energy to the object under investigation. The energy transmitted to the object can be of a form which will pass through the object, for example, ultrasonic waves to obtain a view of internal features. Energy passing through the object is reflected back to the surface through which it entered the object by discontinuities within the object. The reflected waves are received by the scanning device where they are divided into separate channels. The two channels individually process the received signals which are then used to actuate a read-out device such as an oscilloscope. The visual read-out from the oscilloscope is then photographed by use of a stereo camera and a three-dimensional picture is obtained.

31 Claims, 9 Drawing Figures

PATENTED DEC 5 1972  3,705,261

SCANNING SYSTEM FOR YIELDING A THREE-DIMENSIONAL DISPLAY

BACKGROUND OF THE INVENTION

Various types of scanning devices utilizing energies such as sound or radar are presently available in the art. For example, ultrasonic energy has been used for the non-destructive examination of metallic objects such as castings. Ultrasonic energy has also been used to a limited extent for medical diagnostic examinations. Low frequency sound has also been used for scanning techniques such as seismic exploration. Sonar is another example of the use of sound in a scanning technique.

It is also known that radar can be used for various scanning systems, for example, ranging and in some instances for contour development of land areas. Infrared scanning techniques are also used to develop land and weather maps.

The preferred embodiment of the instant invention is described with respect to the ultrasonic medical diagnostic techniques relating to the human body. It is pointed out, however, that the invention is not limited to this particular usage as it can be used with low frequency sound and also with radar and other forms of energy, the only differences being the transducer used for transmitting and receiving the scanning energy and also the frequency response of the components within the system.

Ultrasonic energy, as used in presently existing diagnostic applications, involves the use of a presentation in which reflections from internal discontinuities or irregularities are presented as vertical pips on horizontal sweeping lines of a read-out device such as an oscilloscope. The visual read-out is, therefore, strictly two-dimensional when considering the entire presentation; that is, the presentation on the oscilloscope face is two dimensional when considering the full sweep of the scope and the pip which occurs because of the continuity. However, the presentation, which represents the discontinuity, is essentially a one-dimensional read-out. For this reason, it is very difficult to correlate the occurrence of the pip along the sweep with the area in the object which causes the discontinuity. Furthermore, it is only possible to identify the depth of the discontinuity within the object. These systems are, therefore, cumbersome to use in that they require a substantial number of scans and a large number of pictures must be studied before a fairly accurate indication of the location of the discontinuity is obtained. The accuracy of these systems is therefore quite limited.

Later systems which improve upon the above mentioned systems yield a presentation which represents the discontinuity in two-dimensional form. In these types of systems a series of the two-dimensional pictures is required in order to cover a solid body completely. The major disadvantages of the prior art systems described above are a consequence of the manner in which the scanning beam is moved in relation to the body under examination and also in the manner in which the information contained in the reflected signal is displayed. For both types of existing systems, a large number of pictures must be viewed or considered in order to make a thorough inspection of the object under investigation. However, in most cases only one or two pictures contain the discontinuity or feature of interest. Until now no way of integrating a reflected display has been described which optimally utilizes the ability of the human eye to perceive and distinguish imperfections or discontinuities.

SUMMARY OF THE INVENTION

The system described herein produces in a single exposure a pair of visual read-outs or photographs which can be viewed as a stereoscopic image of the object under investigation. Because the scanning energy penetrates the object the image is three-dimensional and is depth revealing, i.e., revealing those features in the interior which reflect energy more than the surrounding volume. Through the integrating capability of the human eye, features of the scanned object are seen in proper perspective and with true relative sizes and shapes. The two pictures which compose the stereo picture must be viewed at the proper object distance with near equal illumination and in the correct angular relationship for the three-dimensional perspective to be correct. The visual presentation will, therefore, be viewed with stereoscopic viewer or projector, both of which are well-known in the art, when examining the pictures taken by the inventive system.

The three-dimensional scanning device of the invention includes a transmitting transducer and at least one receiving transducer which are mechanically coupled such that they move vertically and horizontally in unison. The scanning energy is transmitted in the form of very short pulses by the transmitting transducer to the object under investigation. Any discontinuities lying within the body or the scanned surface, depending upon the form of energy used, reflect the energy back to the receiving transducer arrangement.

The mechanical mechanism upon which the transmitting and receiving mechanism are mounted is equipped with motion sensing means which detect the horizontal and vertical scanning motions of the transducers. If the read-out means is an oscilloscope the vertical motion can be used to actuate the vertical deflection plates and the horizontal motion outputs used to actuate the horizontal deflection plates of the cathode ray tube.

The received energy is split into two channels, each of which contains a visual read-out device such as an oscilloscope. The outputs of the two channels respectively actuate the brightness control of the respective oscilloscopes. Consequently, when the reflected energy is received back from a discontinuity the brightness of the sweeping spot on the scope face increases in intensity. Superimposed upon the horizontal plate voltage is a high frequency voltage which effects what might be termed a "mini scan" on the horizontal deflection plates. This causes the spot location to be corrected for an off axis viewing perspective during the vertical and horizontal movement of the scanning mechanism. The two visual indications present upon the two oscilloscope screens are photographed by a stereoscopic camera. The photographs are then viewed through an appropriate viewer or projector to yield a three-dimensional display of the scanned object.

In the preferred embodiments the scanning energy is ultrasonic sound and the object under investigation is the human body. The revealed discontinuities will therefore be such medical abnormalities as breast cancer or abdominal tumors. However, as stated hereinabove, other forms of energy and other types of objects are within the scope of the invention.

DETAILED DESCRIPTION OF THE INVENTION

Figure 1:
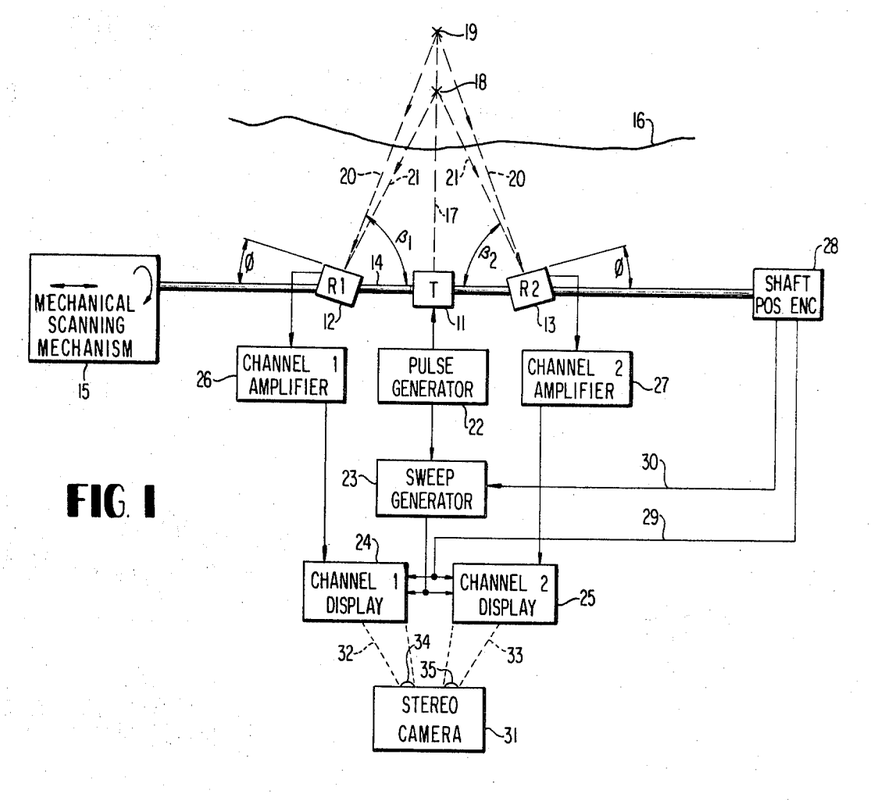
FIG. 1 shows a first preferred embodiment of the instant invention in a simplified block diagram form.

FIG. 1 shows a first preferred embodiment which includes a transmitting transducer 11 and two receiving transducers 12 and 13. It should be noted that for the purposes of explanation, the transducers 11, 12 and 13 are piezo electric crystals and the scanning energy is ultrasonic sound waves. However, this is for the purpose of explanation only as other transducers can be used and other forms of energy and sound can also be used. This is also true of the embodiment described with respect to FIG. 3 which is particularily useful with radar and other forms of energy.

Piezoelectric crystals 11, 12 and 13 are affixed to a shaft 14 such that they move in horizontal and vertical unison as shaft 14 is sectored by a mechanical scanning mechanism 15. The scanning mechanism 15 operates to move the shaft 14 horizontally along the object 16 under investigation while at the same time oscillating it vertically so that an area of the object is scanned. The horizontal motion can also be rotating so that the transmitted energy horizontally scans the object. Alternatively, electrical scanning can be used so that mechanical movement is not required. A transmitted energy beam 17 penetrates the surface of the object 16 and is reflected by any discontinuities 18 or 19 internally present within the object. The reflected rays 20 and 21 are received by the receiving transducers 12 and 13. Transmitting transducer 11 is designed such that a very narrow beam of energy is transmitted to the object. The receiving piezoelectric crystals 12 and 13 are set at an angle with respect to the axis of shaft 14. They are therefore symmetrically oriented with respect to transmitting piezo crystal 11. The spacing between the crystals and the angle determines the distance the reflected energy must travel to the receiving elements. As is explained hereinafter, this is important in setting some of the control circuits. However, no particular angle or spacing is critical.

A pulse generator 22 generates a pulse of energy which is 1 microsecond or less in duration. This electrical pulse actuates the transducer 11. Piezoelectric crystal 11 responds to the electrical pulse from the pulse generator 22 and generates a very short pulse of ultrasonic energy which is transmitted, as represented by line 17, to the discontinuities 18 and 19 contained within the body.

The output pulse of generator 22 also actuates the sweep generator 23, the output of which actuates the horizontal deflection plates of the two oscilloscopes 24 and 25.

The energy received by the receiving transducer 12 and 13 is respectively fed to the channel 1 amplifier 26 and the channel 2 amplifier 27. Amplifier 26 is connected to the brightness control of the oscilloscope 24 while the output of amplifier 27 is connected to the brightness control of the oscilloscope 25. Therefore when a reflected signal is received by the receiving transducers 12 and 13 the intensity of the spot sweeping across the faces of the oscilloscopes 24 and 25 substantially increases indicating a discontinuity within the object 16.

A shaft positioning indicating mechanism 28 is coupled to one portion of the shaft 14. This can be in the form of potentiometers which yield voltages representative of the horizontal and vertical movement of shaft 14. The output of the vertical motion mechanism is connected by line 29 to the vertical deflection plates of the two oscilloscopes 24 and 25. The output of the horizontal motion sensing mechanism is connected by line 30 and through sweep generator 23 to the horizontal deflection plates of oscilloscopes 24 and 25.

A stereo camera 31 is positioned with respect to the oscilloscopes 24 and 25 such that the fields of view 32 and 33 of the lenses 34 and 35 cover the faces of the two scopes respectively. Accordingly, when the photographs of the two oscilloscope displays are simultaneously viewed through a stereo viewing or projecting mechanism a three-dimensional display is presented.

Figure 2A:
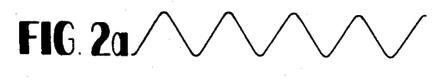
FIGS. 2a, 2b and 2c show waveform applied to the control plates of the cathode ray tubes, and are useful in understanding the invention.
Figure 2B:
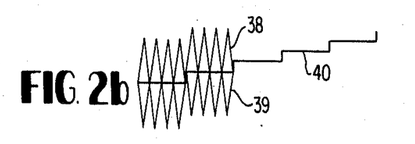
Figure 2C:
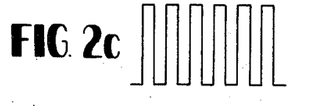

FIGS. 2a, 2b and 2c are useful in understanding the display which is presented on the oscilloscopes 24 and 25. FIG. 2a shows a waveform which is applied to the vertical deflection plates of the two oscilloscopes. This is a continuously varying signal having a frequency in the order of 225 cycles per minute. This signal is generated by the vertical scanning detection mechanism present in the shaft position mechanism 28 shown in FIG. 1. Accordingly, shaft 14 and the transducers 11, 12 and 13, coupled thereto, are sectored through an angle of approximately 40° at the frequency of 225 cycles per minute. The horizontal output of the shaft positioning indication mechanism 28 is applied to the sweep generator 23. As is more fully explained hereinafter with respect to FIG. 4 this voltage, combined with the voltage of a ramp generator is applied to the horizontal plates of the two oscilloscopes 24 and 25. The horizontal output is the step voltage 40 shown in FIG. 2b. The horizontal deflection plates of the two oscilloscopes are therefore stepped in 200 equal steps in a time period of 27 seconds, for example, which is the time required to complete one full scan of the object under investigation.

The cathode ray tube spot motion which results from the outputs of the motion sensors is therefore shown in FIG. 2c.

As shown in FIG. 2b, two high frequency voltages 38 and 39 which are respectively positive and negative are also applied to the horizontal deflection plates of the oscilloscopes. The positive voltage 38 is applied to the horizontal deflection plates of one of the scopes while the negative is applied to the deflection plates of the other scope. A more detailed showing of the manner in which these are applied is also presented with respect to FIG. 4. The effect of the voltage is not added to FIG. 2c because it would confuse the illustration.

Figure 3:
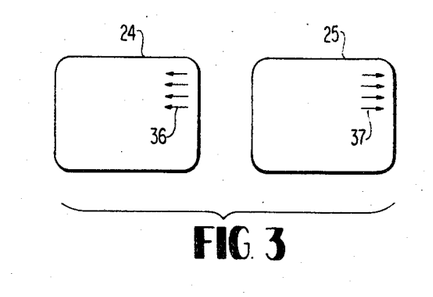
FIG. 3 shows the scans on the two cathode ray tubes.

As shown in FIG. 3, because this voltage is superimposed upon the horizontal sweep voltage the oscilloscopes will present a series of very small sweeps referred to above as "mini scans," indicated by reference numerals 36 and 37 on the two scope faces 24 and 25 respectively. Accordingly, as the scanning mechanism scans vertically and horizontally the presentation on the scope faces will result in two small scanning patterns 36 and 37 shown in FIG. 3. The two voltages 38 and 39 which create the two scans 36 and 37 are of opposite polarity. The two "mini scans" are in opposite directions, as illustrated. The scope 25 whose photograph will be viewed by the right eye has a scan moving from left to right. Accordingly, when these photographs are viewed through the proper viewer or projector a three dimensional display is presented. Also, as the scanning mechanism moves across the object under investigation, the scanning pattern moves across the face of the oscilloscopes and accordingly, the exact locations of any discontinuities within the object are represented by their locations on the oscilloscope face. Furthermore, the depth of the discontinuity within the object is visualized because of the visual fusion of the two images into a three-dimensional view. Therefore, to summarize, the transducer 11 is excited by pulse generator 22 to transmit an energy impulse to an object. Generator 22 is also coupled to sweep generator 23 whose output voltages (shown in FIGS. 2a and 2b) are applied to the horizontal and vertical deflection plates of two CRTs on whose screen appear channel displays 24 and 25 (FIG. 3). One mini-scan sweep (38, 39) is made for each pulse transmitted to the object. Voltage signals from shaft position encoder 28 are coupled to the CRTs so that the reference position of the CRT scanning beam at the time of generation of each mini-scan represents the horizontal and vertical coordinate position of the sending transducer. When a reflected signal (e.g. from point 18,19) is received by the receiving transducers R1, R2 it is coupled by channel amplifiers 26, 27 to the intensity controls of the CRTs having left and right channels display screens 24, 25. The sudden increment signal applied to the brightness control causes a bright spot to appear on the left and right screens 24, 25 at the instantaneous position of the mini-scan sweep 38,39 then being carried out by the scanning beam, to the left and right respectively of the position of the mini-scan which represents a reference position which might be e.g. the body surface (means being provided, e.g. by blanking one shot 71 FIG. 5 to blank the surface of the CRT screen until energy impulses return from the object surface is possible, thereby eliminating possible screen clutter). As a complete sweep across the object (represented by one complete sweep of the CRT scanning beam across the screen, although comprising a multitude of mini-scans) may take sometime, a camera is ordinarily provided to record all impulse echoes appearing on the CRT screen during that sweep. The resulting pictures of the left and right screen, viewed simultaneously and directly and without transposition or reversal, provides a three-dimensional view of the object surveyed.

Figure 4:
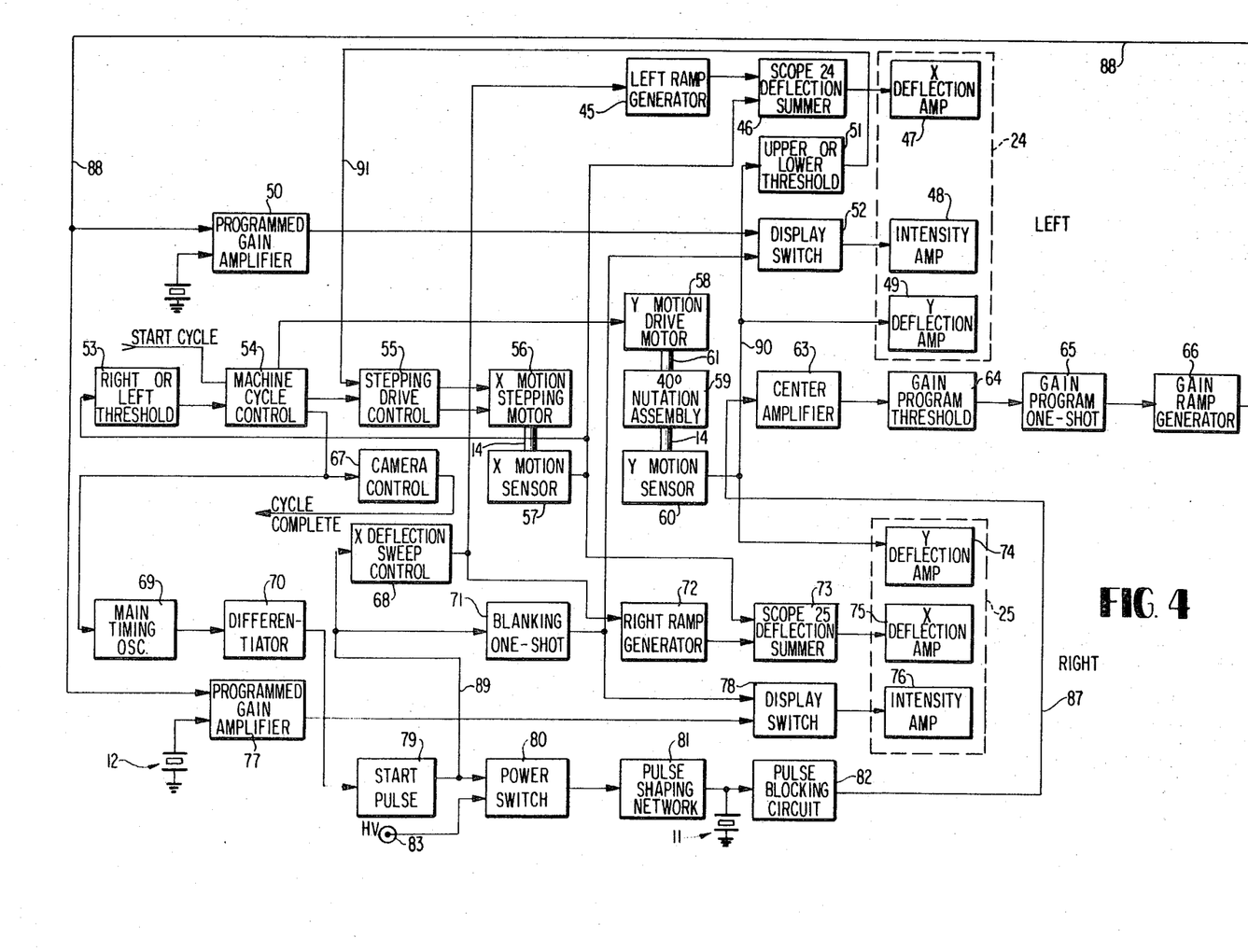
FIG. 4 is a detailed block diagram of a first preferred embodiment of the invention.

Reference is now made to FIG. 4 which is a more detailed showing of a preferred embodiment of the instant invention. In referring to FIG. 4 it should be noted that the reference numbers generally run from left to right and from top to bottom, this is done in order to facilitate the locating of the various elements as they are referred to.

A transmitting transducer is represented as a piezoelectric crystal 11. Piezoelectric crystal 11 has a large diameter, relative to the wavelength of the energy transmitted, for example one inch or more, and is capable of producing a narrow beam of ultrasonic energy which is directed generally toward the object under investigation.

Piezoelectric crystal 11 is electrically actuated by Start Pulse Generator 79 through a Power Switch 80 and Pulse Shaping Network 81. State Pulse Generator 79 generates a very short pulse of energy, such as 1/10 microsecond, which is transmitted to the Transducer 11. This short duration pulse of electrical energy causes the piezoelectric crystal 11 to generate a very short pulse of ultrasonic energy.

Power Switch 80 applies the high voltage present at terminal 83 to the piezoelectric crystal during the duration of the pulse generated by Start Pulse Generator 79. Pulse Shaping Network 81 is used to more ideally shape the start pulse and is an optional feature depending upon the qualities of the pulse generated by the Start Pulse Generator 79.

The piezoelectric crystal 11 is also coupled to a Pulse Block Circuit 82. The initial high voltage pulse is blocked by the Pulse Block Circuit 82 from coupling to a Center Amplifier 63. However, after the high voltage pulse, Pulse Block Circuit 82 couples the reflected signals from piezoelectric crystal 11 to the Center Amplifier 63. This enables The first reflection from the surface of the Object 16 under consideration to initiate the Gain Ramp Generator 66.

The output of Center Amplifier 63 is coupled to Gain Ramp Generator 66 through a Gain Program Threshold 64 and a One Shot Gain Program Circuit 65. Gain Ramp 66 generates a ramp which is fed by line 88 to the inputs of the Programmed Gain Amplifiers 50 and 77. Gain Ramp Generator 66 runs for a period of time required to get a reflected signal from the deepest point within the object under investigation.

Gain Threshold Program Circuit 64 merely prevents initiation of the Gain Ramp Generator by spurious signals before the first reflection, while the One Shot Gain Program Circuit 65 is used to start the gain control ramp generated by Ramp Generator 66 upon the reception of the first reflection.

The output of Start Pulse Generator 70 is also coupled to the input of a Horizontal Deflection Sweep Control circuit 68 by line 89. The Start Pulse Generator 79 receives the output of Main Timing Oscillator 69 through an optional Differentiator 70. Oscillator 69 therefore sets the entire circuit into operation and establishes the timing functions required.

The output of Horizontal Deflection Sweep Circuit 68 is coupled to Right Ramp Generator 72 and Left Ramp GEnerator 45. Right Ramp Generator 72 and Left Ramp Generator 45 are respectively coupled to the Horizontal deflection amplifiers 75 and 47 of the oscilloscopes 24 and 25. These couplings are accomplished through Scope 25 Deflection Summer 73 and Scope 24 Deflection Summer 46 respectively. The output of the Horizontal Deflection Sweep Circuit 68 therefore controls the initiation of the sweeping waveforms 38 and 39 shown in FIG. 2b so that these sweeping voltages are correlated with the start pulse generated by the Start Pulse Generator 79. The output of Right Ramp Generator 72 adjusts the position of the spot on oscilloscope 25 for increases in the angle B of FIG. 1 as reflections are received from discontinuities of increasing depth. The output of Left Ramp Generator 45 accomplishes the same function for the other channel.

Because the two small sweeps 36 and 37 shown in FIG. 3 are in opposite directions the outputs of Right Ramp Generator 72 and Left Ramp Generator 45 must be of opposite polarities. This is accomplished as shown by using the two separate generators 45 and 72. However, it should be noted that a single ramp generator can be used and its output reversed before being applied to one of the deflection circuits 46 or 73.

The physical control of the sweep and nutation of the transducers 11, 12 and 13 is accomplished through the Machine Cycle Control circuit 54.

The output of the Machine Cycle Control circuit 54 is coupled to a Stepping Drive control 55 which controls the motion of a horizontal motion Stepping Motor 56. Stepping motor 56 is of a type well-known in the art and forms no part of the instant invention. However, it should be noted that depending upon the direction of motion of the scanning device desired the direction of rotation of the motor 56 will change as indicated by the + and − polarities of input signals thereto.

The horizontal motion Stepping Motor 56 is coupled by shaft 14 to the horizontal motion sensor 57. Motor s Sensor 57 is a part of the shaft position mechanism 28 shown in FIG. 1. The output of the horizontal Motion Sensor 57 is coupled to the horizontal Deflection Plates Amplifier 75 of scope 25 through the Scope 25 Deflection Summer 73. Motion Sensor 57 is also coupled to the horizontal Deflection Plate Amplifier 47 of a scope 24 through the Scope 24 Deflection Summer 46. The waveform shown in FIG. 2b is therefore applied to the deflection plates of the two scopes 24 and 25.

The output of the Machine Cycle Control Circuit 54 is also coupled to the Vertical Drive Motor 58. A mechanical coupling 61 couples Motor 58 to a 40° Sectoring Assembly 59. This causes the shaft 14 shown in FIG. 1 to be sectored vertically and continuously through a 40° angle, for example. Sectoring Assembly 59 is coupled to the Vertical Motion Sensor 60 through the shaft 14. The output of Sensor 60 is coupled to the Vertical Deflection Plate Amplifier 74 of oscilloscope 25. A similar connection is made to the Vertical Deflection Plate amplifier 49 of the oscilloscope 24.

The output of Vertical Motion Sensor 60 is also coupled to the Upper or Lower Threshold Control Circuit 51 by way of Line 90. The output of Upper or Lower Threshold Circuit 51 is coupled by way of line 91 to the input of the Stepping Drive Control 55. This correlates the stepping of the horizontal stepping motor with the vertical positioning of the Sectoring Assembly 59 so that horizontal stepping occurs only at the peaks and valleys of the vertical stepping motion.

The output of Machine Cycle Control Circuit 54 is also coupled to a Camera Control Circuit 67 the output of which is indicated as "cycle complete." This output can be used to shut down the system at completion of the scanning operation. Alternatively, it can be used to reactuate the Machine Control Circuit 54 and Pulse Generator 79 at the end of the scan. The scanning mechanism would then be returned to its normal starting position for a repetitive scan of the same object.

The output of Start Pulse Generator 79 is also connected to a Blanking Circuit 71, the output of which is coupled to Display Switches 78 and 52. Display switches 52 and 78 are respectively coupled to the Brightness Control Circuits 48 and 76 of the oscilloscopes 24 and 25. The Display switches 52 and 78 are used to shut off the display for a period of time which is required to receive the first reflected signal. This prevents confusing the display by spurious signals such as might be received through the mechanical coupling mechanism.

The Main Timing Oscillator 69 controls the timing functions for the operation of the entire system. This oscillator has a period slightly greater than the time required for reflections from the deepest discontinuity of interest. This insures that the next transmitted impulse will not occur until reception of the last reflected signal.

The receiving transducers 12 and 13 are respectively coupled to the inputs of Programmed Gain Amplifiers 77 and 50. Amplifiers 50 and 77 also receive an input from the Gain Ramp Generator 66 by way of line 88. The gain of the two amplifier 50 and 77 is programmed by the Gain Ramp Generator 66 output so that the decay of the reflected signal as a function of increasing depth of the discontinuity within the object is compensated for. An amplifier which can be used for this purpose is model number 316 produced by Ithaco, Inc., of Ithaca, N.Y.

The output of the two amplifiers 50 and 77 are respectively directed to the Spot Intensity Amplifiers 48 and 76 of the oscilloscopes 24 and 25 respectively. Accordingly, when a reflected signal is received by the receiving transducers 13 and 14 the intensity of the spot which sweeps the face of the two oscilloscopes increases indicating the presence of a discontinuity which reflected the received signal.

OPERATION

Initially, preceding the initiation of the system, the Horizontal Motion Sensor is located at the extreme right or left position, depending upon the desired direction of sweep. The scanning system is at rest and no start pulse has been generated.

The system is actuated by a voltage source, not shown. This turns on Oscillator 69 and simultaneously actuates Machine Cycle Control 54. The Vertical Drive Motor 58 and Horizontal Stepping Motor 56 are turned on by Machine Cycle Control 54. Vertical drive motor 58 then causes the vertical sectoring of the transducer assembly through a 40° excursion. Each time the vertical sector reaches its upper or lower threshold, Upper or lower Threshold Control 51 actuates Stepping Drive Control 55. Stepping Motor 56 is moved one step in a horizontal direction. Horizontal stepping is repeated 200 times, in equal steps, to complete the scan. Upon completion of the scan Threshold Control 51 shuts down Machine Cycle Control 54 and Oscillator 69.

Camera Control 67, which is also actuated by Machine Cycle Control 54, controls the movement of view film through the Camera 31, shown in FIG. 1. The scanning movement of the transducer assembly and movement of the film are therefore accurately correlated, so that the film is advanced at the end of each complete scan.

The initation of the system and the consequent actuation of Oscillator 69 result in the generation of a start pulse by Start Pulse Generator 79. The start pulse causes an impulse of ultrasonic energy to be generated by piezoelectric crystal 11. The start pulse is blocked from triggering the Gain Program Threshold 64 by the Circuit 82. The first reflection received by Piezoelectric crystal 11 produces an electrical signal which is coupled to the Gain Ramp Generator 66, through the Center Amplifier 63 and the Grain Program Threshold 64 and Gain Program One Shot Circuit 65. The variable gain feature of amplifiers 50 and 77 is therefore started at this time. Gain ramp generator 66 runs for a period of time which is required to receive a reflected signal from the deepest point within the object under investigation. Therefore, the gain of the amplifies 50 and 77 is greatest at the end of this period. However, after this point is reached the output of Gain Ramp Generator 66 returns to the initial value until triggered again.

The start pulse is also coupled to Horizontal Sweep Control 68 and therefore causes Right Ramp Generator 72 and Left Ramp Generator 45 to produce horizontal deflection voltages. These voltages adjust the spot position on oscilloscopes 24 and 25 for off axis viewing perspective.

The start pulse also causes the Blanking One Shot 72 to turn off the Intensity Amplifiers 48 and 76 of oscilloscopes 24 and 25 respectively through the Display Switches 52 and 78. This prevents the display of spurious signals before the first reflected signal is received.

The nutation of the transducer assembly is continuous and a start pulse is generator for each cycle of the output of Oscillator 69. Accordingly, each start pulse causes a different area of the object to be probed.

In operation the mechanical control mechanism causes the transducer mechanism to sweep vertically up and down and horizontally across the object. The spots on the two oscilloscope faces remain dark until a discontinuity within the object under investigation is detected. When the energy passing into the object meets with such a discontinuity the ultrasonic wave is reflected back to the receiving transducers 12 and 13. The received signals are amplified in the Amplifiers 50 and 77 and injected into the Intensity Control Circuits 48 and 76 through the Display Switches 52 and 78. This causes an increase in the intensity of the spot sweeping the oscilloscope faces indicating a discontinuity. Because the scanning continues both vertically and horizontally the spot intensity is increased each time the energy is reflected back to the receiving transducer by the discontinuity. Accordingly, a two-dimensional view of the discontinuity is presented on each of the two oscilloscope faces. By combining photographs of the two presentations present on the oscilloscopes with a stereo camera a three-dimensional representation of the discontinuity is realized.

The inventive system has many advantages over the prior art systems. For example, the presentation is stereoscopic and therefore produces a three-dimensional image. A reduced amount of film is used in that one scan will show the entire discontinuity. Furthermore, the scanning is quite rapid and good resolution can be achieved in a 1 minute or a ½ minute scan. The system described can therefore be used in many diverse applications. For example, it can be used as a medical diagnostic instrument to scan soft tissue such as the abdomen and breast to detect the presence of tumors, and other abnormalities. It can also be used in the non-destructive examination of solid or liquid products. The system can be used for under water vision and similar techniques, as well as with radar equipment.

The invention described up to this point has been directed to an embodiment including one transmitting and two receiving transducers. It should now be noted that the system works equally well with a single transducer which serves as both the transmitting transducer and the only receiving transducer. The two receiving transducers 12 and 13 are therefore eliminated. This can best be understood by referring again to FIG. 1 and assuming that the receiving transducers are eliminated. Because the discontinuity is directly along the transmitted energy path, the time of reception of its reflected signal completely defines its position irrespective of the number of receiving transducers used. The time of reception of a reflected pulse determines when the intensity increase of the spot occurs. Therefore, the time of reception of the reflected pulse is the sole determinant of where the spot appears on the display. For this reason the displays on the oscilloscopes 24 and 25, which are dependent upon the reflected energy received by the transducer are identical within the capability of duplicating the equipment within the two channels. The displays are therefore different only because they are swept differently by Right Ramp Generator 72 and Left Ramp Generator 45 as shown in the FIG. 4 embodiment. It is therefore, evident that the stereoscopic display is not dependent upon the number of transducers but merely upon the manner in which the received energy is utilized.

To understand more fully how the system synthesizes a right eye and left eye view of the object being scanned, it may be useful to imagine that the single piezoelectric transducer is effectively located midway between the eyes of the viewer. Each impulse generated by the transducer travels away from the viewer and echoes are received from progressively more distant points. Referring to FIG. 1, the crystal used for both transmission and reception is designated by T 11. For purposes of this description the right eye is called R2 (13) and left eye R1 (12).

Each impulse generated by the transducer T travels along the axis 17 and in the case shown, reflections occur at points 18 and 19 within the object being scanned 16. Since the receiver is located in the transducer block T, signals are received at two successive times; first a reflection from the nearest point 18 and then from the furthest point 19. The propagation distance 18 is shorter than that to 19 therefore, the echo from 18 always arrives at T earlier. If we are to compose an image portraying the two reflections in the proper perspective, then we must compose a right eye view showing the nearest point 18 on the left of the furthest point 19. The left eye view must shown the nearest point 18 to the right of the furthest point 19. The same echo indications may be used for both views, however, the relative locations of the echoes are reversed. This synthetic stereo effect is obtained by mini-scan sweeps which might also be called "stereo sweeps," shown in FIG. 3. The right eye view cathode ray tube 25 has a sweep toward the right which displays echoes from the object being scanned at positions which progress in time toward the right. For any fixed vertical and horizontal pointing direction, the sequence of echoes from points such as 18 and 19 will move toward the right. The arrows 37 represent the locations of echoes if they should be received. The manner of representing the echoes is brightness. Therefore, if no echoes are received the scan is not visible.

FIG. 3 also shows the left eye view cathode ray tube. The mini-scan on this display is toward the left, representing displacement of the expected position of echoes from the scanned object, which in time progresses toward the left. When the echo is received it will appear on both cathode ray tubes simultaneously — on the right hand tube 25 to the right of the sweep starting point, on the left hand tube 24 to the left of the sweep starting point.

FIG. 1 shows a single pointing direction of the transmitter. During a scanning cycle each point on the object being scanned is intercepted by one acoustic impulse along the axis of the transducer 17. A mini-scan phase echoes, if they occur, at the proper position on both right and left CRTs with respect to the pointing direction. Note that the origin of the mini-scan sweep must be moved in accordance with the pointing of the transducer so that a complete picture will be produced. Thus, there are three sweeps applied to the two CRTs. The vertical sweep whose voltage is similar to the wave shown in FIG. 2A moves the origin of the mini-scan sweeps up and down corresponding to the vertical sectoring motion of the transducer. Both CRTs 24 and 25 have this voltage applied to the vertical deflection system. The horizontal scan for both tubes is in two parts. FIG. 2B shows the step-wise voltage 40 which moves the origin of the mini-scan sweeps on both tubes from right to left. This occurs as the transducer housing is stepped from right to left. Superimposed on this stepwise increasing voltage is the mini-scan voltage 38 for the left CRT 24 and 39 for the right tube 25. Note that the mini-scan on tube 24 is in the same direction as the horizontal scan and peaks of the mini-scan voltage 38 are upward as is the general trend of the horizontal scan voltage 40. Contrast this to the peaks of the mini-scan voltage 39 applied to the right tube 25; these are in opposition to the horizontal scan voltage 40. During a complete scanning cycle each point on the tube serves as an origin of the mini-scan, in direct correspondence to the pointing of the transducer toward that direction in the object being scanned. The mini-scan produces stereo separation by displacing echo indications within the image plane to correct for displacement of the viewing eye to the right or left of the transducer.

FIG. 3 shows the format of photographs produced by this system. The left picture 24 shows the view of the scanned object presented to the left eye. The right eye view 25 is presented to the right eye. Each of these is a photograph of the face of a cathode ray tube. Because the scanning time for a complete cycle is approximately 1 minute it is impractical to view the CRT image directly. Instead the image is recorded on conventional 70 mm instrumentation film which has the dynamic range (range of brightness recording) and other emulsion properties necessary for production of a reliable record.

All this occurs as the object is scanned. At any instant the brightness on both CRTs is representative of the echo amplitude. The left hand CRT is photographed continuously on the left frame of the photograph and all bright indications of acoustic reflections appear on the film in locations selected by the three sweep voltages. At the same time a right photographic frame is produced. After exposure to one scan the photographic film is advanced and developed. With left eye viewing the left frame and right eye viewing the right frame, the scene is what one would expect if the viewer could see the ultrasound reflections from a transducer located midway between his eyes. While there are minor aberrations in perspective the stereo representation is quite close to a true picture providing the sweeps are linear, etc.

A three dimensional visual readout can therefore be obtained by using a single receiving transducer and injecting the received signals into two channels which are swept by signals of different polarities. The system is therefore operative with a single transmitting transducer and a single receiving transducer, or a single transducer which both transmitts and receives. It should be noted that in an embodiment employing a single transducer for both receiving and transmitting the directional characteristics of the transducer are increased as compared with those of the three transducer embodiments.

Figure 5:
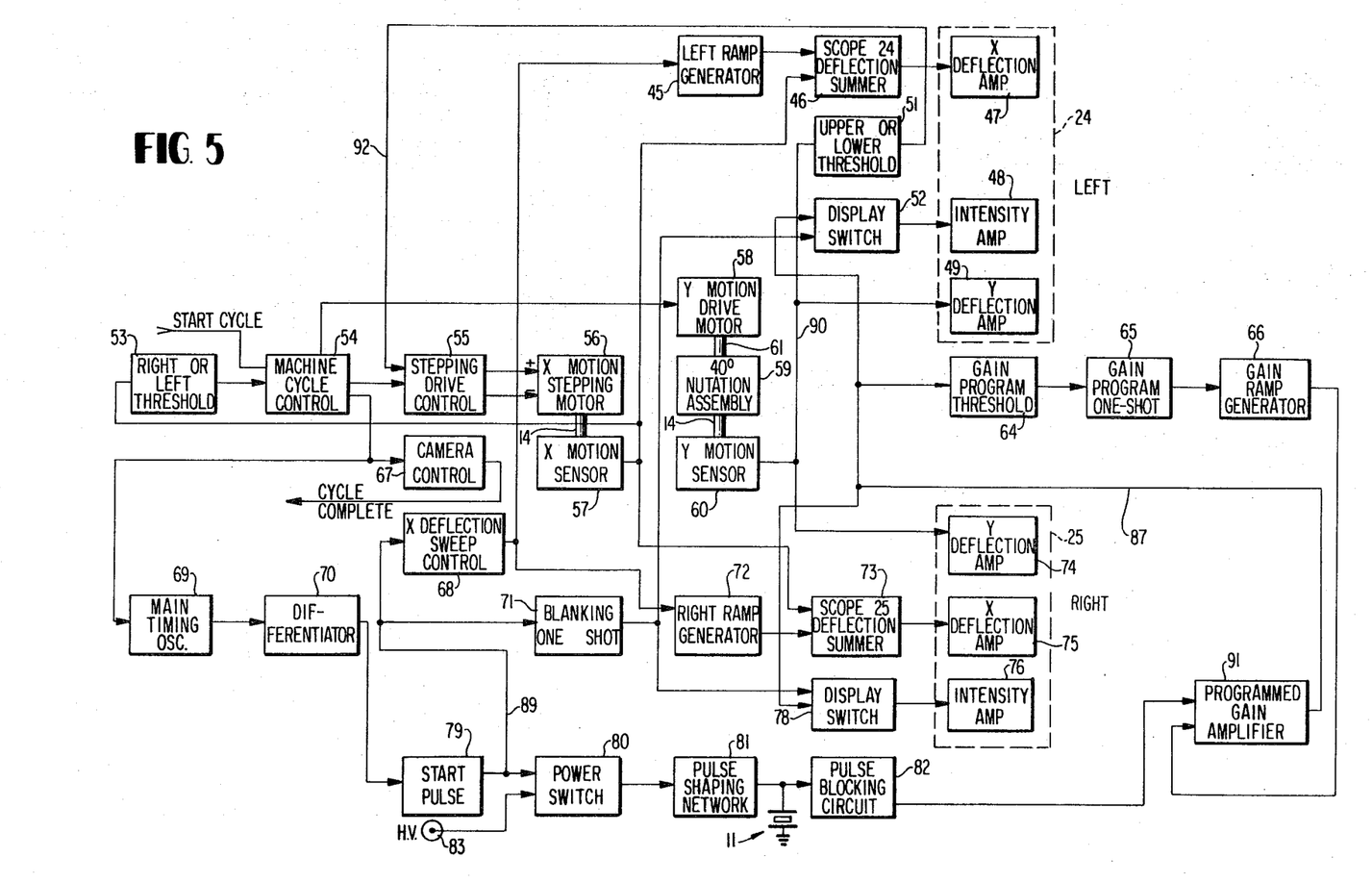
FIG. 5 is a detailed block diagram of a second preferred embodiment of the invention.

A system utilizing a single transducer is shown in FIG. 5. This embodiment is substantially the same as that of FIG. 4, except that, one of the Programmed Gain Amplifiers 50 and 77 and the two receiving Transducers 12 and 13 have been eliminated. The function of the receiving transducers 12 and 13 is replaced by that of the transmitting transducer 11. A single Programmed Amplifier 191 has been inserted in the output circuit of the Pulse Block Circuit 82. The output of Amplifier 191 is coupled to the inputs of the Display Switches 52 and 78, in the same manner that the individual outputs of the Amplifiers 50 and 77 of the FIG. 4 embodiment are coupled to the same switches. The gain of amplifier 191 is controlled by the Output Gain Ramp Generator 66.

The Pulse Block Circuit 82 operates such that the Amplifier 191 is isolated from the start pulses generated by the Start Pulse Generator 79 but receives the return signals received by the transducer 11.

The embodiment of FIG. 5 whose operating principles are basically the same as the multi-transducer embodiment of FIG. 4, utilizes as a source of main timing oscillator 69. This is an oscillator whose period is such that after each transmitted pulse, the system will wait for echoes from the greatest distance of interest before transmitting another pulse. Such arrangements are well known in sonar and radar. In this system the pulse transmitted is ultrasonic and is produced by a piezoelectric crystal transducer. The transducer is energized for a very short time, about 1/10 of a microsecond by a high voltage through the power switch 80. To prevent overloading the sensitive amplifier during this pulse a block circuit 82 is included. After each transmitted output from transducer 11 ultrasound echoes are received from the object being scanned. Each echo represents an interface of acoustic impedance. In the ideal the transducer 11 may be regarded as transmitting energy only along one line or axis and receiving energy only along the same axis. Thus, only those interfaces which are on the axis will produce echoes. In practice realizable transducers have a beam pattern of ½° or greater and echoes are derived from a "region" of the object being scanned.

Because the object being scanned actually absorbs most of the ultrasound energy and reflections from greater distances are weaker in strength, the amplifier used with this system must have a gain which increases during the interval between transmitted pulses. Such a characteristic is provided by the programmed gain amplifier 191 under control of a varying voltage or gain program produced by blocks 64, 65 and 66. In normal usage the object being scanned will be immersed in a water bath and there is some distance between the transducer 11 and the surface of the object. Water is a low-loss medium for ultrasound so there is no need to increase the gain until echoes are received from the surface of the object. This condition is sensed by the gain program threshold block 64. From this time until echoes are received from the greatest distance of interest, the gain should be increasing. A one shot multivibrator 65 causes an integrator 66 to produce the programmed gain. Just prior to the next transmitted output the gain is restored to a low level so the amplifier is at minimum gain during the transmitted pulse. For example, the main timing oscillator may have a frequence of 800 cycles per second so there are 800 transmitted output pulses followed by an equal number of echo sequences. The first echo, indicative of the surface of the scanned object, causes system gain to begin increasing and this results in echoes from within the object being amplified an increased amount depending on their depth. Without varying gain the intensity with which deeper interfaces are displaced would be inadequate for them to show "behind" surface echoes displayed.

The FIG. 5 embodiment has broad usages with various types of transmitting and receiving mechanism. For example, a continuous radar system incorporating this system can be used to map terrain and weather contours. The system is also quite useful with low frequency sound such as siesmic exploration and sonar for submarine or fish detection.

Figure 6:
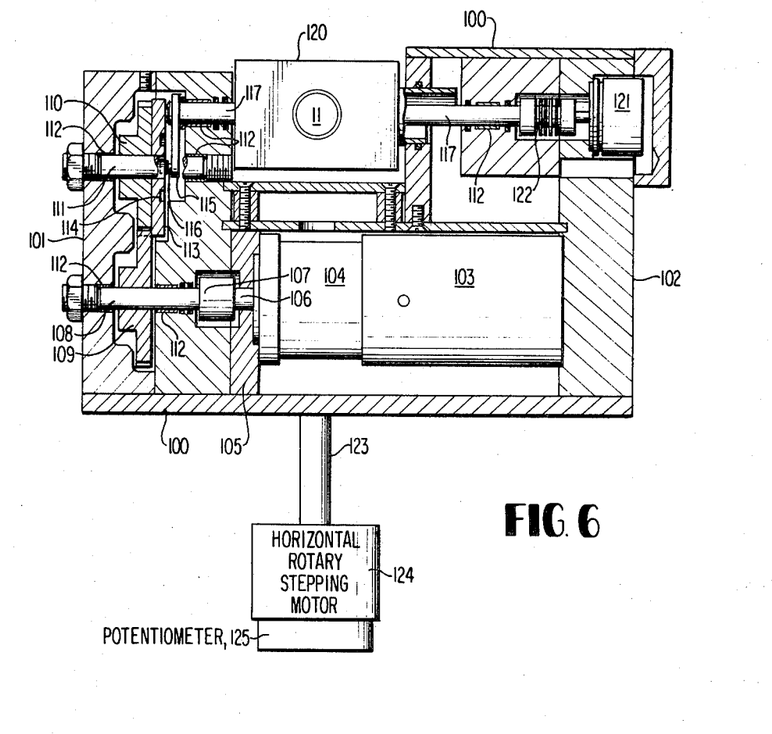
FIG. 6 shows a preferred embodiment of a scanning assembly useful with the invention.

FIG. 6 is a preferred embodiment of the mechanical assembly which can be used to effect the required horizontal and vertical scanning motions. As stated previously, the mechanism must cause a vertical sectoring of the transducer through an excursion of approximately 40° while simultaneously effecting a horizontal stepping motion. The stepping motion can be either linear or rotational as explained hereinabove. Obviously, the sectoring can be horizontal and the stepping motion vertical if the object field to be scanned requires such an approach.

The embodiment of the scanning mechanism shown in FIG. 6 utilizes a rotational horizontal stepping motion and along with a rotational vertical nutation motion. The scanning mechanism includes a Case 100, a Left End Bell 101 and a Right End Bell 102. The End Bells 101 and 102 are fitted to the Case 100 such that all joints are sealed and the scanning mechanism can therefore be submerged in a liquid such as water without damage. All other joints in the assembly are also liquid tight.

A continuously running synchronous vertical sectoring Motor 103 is positioned inside the Case 100 and is supported on one end by the End Bell 102. The rotational output of the nutation Motor 103 is coupled to an 8 to 1 Reduction Gear 104. Reduction gear 104 is supported on a Support Bracket 105 and accordingly the motor and the bear are supported between the End Bell 102 and the support Bracket 105. Reduction gear 104 couples the rotational output of the motor shaft so that the Output Shaft 106 of the reduction gear runs at ⅛ the rotational speed of the nutation motor. For example, if the sectoring Motor 103 runs at a constant speed of 1,800 rpm the Output Shaft 106 of Reduction Gear 104 runs at a continuous speed of 225 rpm.

The Output Shaft 106 of the reduction gear is coupled to a Shaft 108 through a Coupling Mechanism 107. The Coupling Mechanism 107 is useful in mechanically coupling the two Shafts 106 and 108 and also in ensuring their axial alignment. Sleeve or Ball Bearings 112 rotatable support shaft 108 within casing 100.

A Spur Gear 109 is coaxially affixed to the Shaft 108 such that it is rotated therewith by motor 108. Accordingly, the Gear 109 will rotate at the same rotational velocity as the Output Shaft 106. A second Spur Gear 110 which contains the same number of teeth as Gear 109, and is of essentially the same diameter, engages Gear 109. Because of the similarity of the Gears 109 and 110 a transfer of the rotational motion is effected in a one to one ratio between the two gears. Gear 110 is rigidly mounted on the Shaft 111 which is also mounted by way of Bearings 112 in the Casing 100 and accordingly the Gear is free to rotate within the casing.

A Cam 113 is also mounted to rotate along with the Shaft 111. The Cam 113 accordingly can be fixed to gear 110 or to the shaft 111 or both. However, its rotational speed is exactly equal to that of the Gear 110, and therefore that of Output Shaft 106 of Speed Reducer 104.

Figure 7:
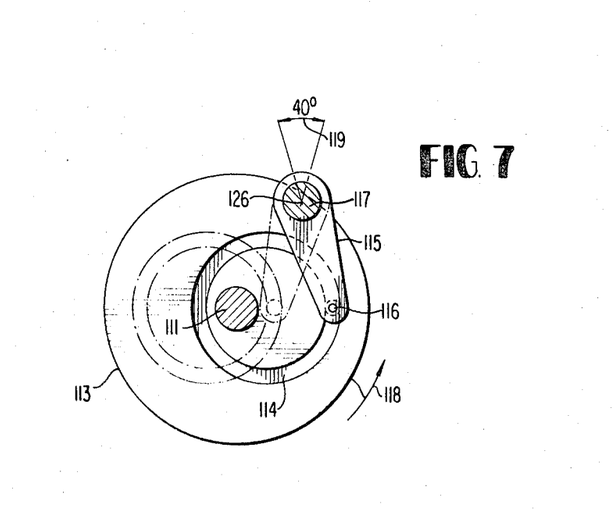
FIG. 7 shows the cam and mechanical linkage which effect the vertical sectoring.

As shaft seen in FIG. 7, Cam 113 includes a continuous Slot 114 which engages a pin 116 permanently affixed to a Follower Arm 115. The continuous rotation of Shaft 111 causes a continuous rotation of Cam 113 in a direction, for example counter clockwise, as indicated by the Arrow 118. The continuous Groove 114 is positioned on the Cam 113 such it is nonconcentric with the Shaft 111. Groove 114 is configured by use of a computer program such that the velocity of Arm 115 is constant for all positions for the Pin 116 within Groove 114. This is done in a well-known manner and is within the purview of those skilled in the art. Groove 114 is positioned such that Groove 114 remains on the same side of shaft 111 irrespective of the position of Pin 116 within the groove. This avoids interference between shaft 111 and Arm 115, as is indicated by the dashed line position in FIG. 7. Obviously, the location of Groove 114 will be dependent upon its configuration and also is within the purview of those skilled in the art. It is apparent that Groove 114 can be formed in the surface of Gear 110 and cam 113 eliminated.

The engagement of Pin 116 with Groove 114 results in an oscillatory motion of Follower Arm 115. Pin 116 and Groove 115 are precisely machined so that they ride uniformily and smoothly with respect to one another and thereby any variation of motion of Follower Arm 15 is substantially reduced.

Follower Arm 115 rotates about axis 126 through a 40° excursion as indicated by the Arrow 119 during a one-half revolution of the cam 113 and returns to its original position during the other one-half turn of the cam 113. The rotation of Follower Arm 115 is transmitted to Shaft 117 which it is rotatably attached. Shaft 117 is also supported by Bearings 112 and therefore is free to rote within Case 100.

Transducer 11 is permanently affixed to a transducer Support 120 which is affixed to the Shaft 117. Transducer 11 is located outside of the Casing 100 and therefore is exposed to the atmosphere. The other end of Shaft 117 is coupled to a potentiometer 121 through a Bellows Mechanism 112. Potentiometer 121 is used to give an electrical indication of the vertical motion of the Transducer 11, which obviously is the sectored motion of Shaft 117 whose axis passes through the center o of transducer 11. Bellows 122 is the mechanical coupling mechanism between Shaft 117 and the Potentiometer 121 and is useful in eliminating misalignment between the potentiometer element and the Shaft 117.

The entire scanning mechanism is supported on the Shaft 123 of the Horizontal Stepping Motor 124. The stepping motion of the scanning device is therefore effected by rotating the Stepping Motor 124 in the appropriate direction. It should be noted, as explained hereinabove that the stepping motion is timed such that it occurs when the transducer is pointed in the upper and lower most vertical position of its vertical motion, that is, when Shaft 117 is in the extreme position of its excursion. As described above, through the operation of motor 103, transducer 11 traverses a vertical sector of 40° in a cyclic fashion. Stepping motor 124 displaces this vertical sector so that each vertical slice of the object being scanned is covered only once. A potentiometer 125 is coupled to the other end of the Shaft 123 so that this potentiometer yields an electrical output which is indicative of the stepping motion. This coupling can also occur through a bellows such as the Bellows 122 used to couple the Potentiometer 121 and the Shaft 117.

Transducer 11 is positioned with respect to the scanning mechanism such that the vertical axes of symmetry of the transmitting and receiving surface is coincident with the rotational axes of the Shaft 123. Accordingly, as the horizontal and vertical rotations occur the position of the center of the transducer remains constant and only the angle of transmission and reception changes. This lends accuracy to the system and also makes it easier to correlate the outputs of the Potentiometers 125 and 121 with the position of the discontinuity within the scanned object.

Referring back to the embodiment of FIG. 5, which operates on essentially the same principles as that of FIG. 4, although using but a single transducer, these potentiometers 121, 125, produce electrical indications of vertical pointing angles and horizontal pointing angles, respectively. As described above, the signals produced by those potentiometers can be used both to control the scanning cycle and to locate ultrasonically derived information on the cathode ray tubes. In a typical scanning cycle, transducer 11 will initially be pointed toward the lower left hand corner of the object being scanned. As shown in FIG. 2C it will move vertically under control of cam 113. At the top of the 40° sector, horizontal stepping motor 124 will turn housing 100 to the right a single increment and the downward angular motion which immediately follows under control of the cam 113 will be parallel to the upward scan and slightly to the right as shown in FIG. 2C. Continuing this cycle, the entire object is covered by a sequence of vertical scans. The cycle ends in the lower right portion of the object with a downward vertical scan. Thus, it can be seen that the vertical potentiometer 121 is used to control the overall scanning cycle. For example, in FIG. 5, y-motion sensor 60 comprises vertical potentiometer 121 and x-motion sensor 57 comprises horizontal potentiometer 125. Potentiometer 121 may be supplied with a positive potential at one end, a negative potential at the other. The slider voltage is thus an indication of the vertical pointing angle of the transducer. The output of y-motion sensor device 60 goes to upper or lower threshold device 51. The upper or lower threshold device 51 detects the levels of voltage indicating that the transducer is at its upper limit or lower limit and produces an output pulse for either one. Wire 92 thus contains a sequence of pulses occurring at the upper and lower limits of vertical sectoring. This signal energizes the stepping drive control 55 which causes one increment of horizontal motion each time a vertical sector limit is reached. Blocks 58 and 59 are the mechanical parts of the scanner which cause repetitive vertical sectoring. Thus, coverage of the entire object once a cycle has been initiated is assured by this mechanical and electrical combination.

Further, a vertical sectoring in repetitive 40° motions is mechanically produced by motor 58 and sensed by potentiometer 60. At the upper and lower limits of angular motion, the threshold 51 causes a step-wise angular motion in the horizontal direction under control of a stepping drive and motors 55 and 56. For mechanical reasons in the actual equipment horizontal stepping motion on successive scan cycles will be in opposite directions so that one picture will be made stepping from the left to right and the following picture from right to left. This is the reason for the ±inputs to the horizontal stepping motor 56. The horizontal pointing direction is sensed by x-motion sensor 57 horizontal potentiometer and the overall scan cycle is under its control. Connection of the potentiometer may suitably be the same as that of potentiometer 60, that is, a positive voltage is applied to one end and a negative to the other and the slider voltage indicates the horizontal pointing direction. The right or left threshold block 63 detects when a cycle is complete and puts machine cycle control 54 into the condition for reversed stepping direction on the next picture. When the machine cycle control receives the start cycle input, it will initiate vertical sectoring through block 58 and horizontal angular motion through the stepping drive control in the proper direction. At the end of the scanning cycle, indicated by a signal from the threshold block 63, the machine cycle control 54 will turn off vertical sectoring and energize the camera control. The scanning cycle thus automatically covers the object with a single series of vertical sectors and completes the picture.

The mechanical scanning mechanism is now seen to be quite simple in construction and very effective for the intended purposes. Stepping motor 124 is used to rotate the entire device, including the Vertical Motor 103. Complex and expensive mechanisms for independently coupling the two motors to the transducer support are thereby eliminated. The inventive device also eliminates the necessity of turning off, or uncoupling, the Vertical Motor during the horizontal stepping motion. Although horizontal stepping preferably occurs at the extremes of the vertical motor this is a simple timing function performed by elementary circuitry within the electrical system. Continuous running and direct coupling of the Vertical Motor is therefore possible and substantial reductions in the complexity and cost of the device are realized.

I claim:

1. A pulsed echo system for creating a three-dimensional representation from reflected signals comprising:
    scanning means for transmitting at least one energy impulse to an object and receiving at least one reflected energy signal from the object,
    means coupled to said scanning means controlling the transmission of said energy impulse for establishing the reference time of transmission of said energy impulse, and
    means responsive to said energy impulse for displaying a segment of an image representing said object on a display plane,
    said display means including first and second display portions, and
    image position locating means coupled to said reference time means and responsive to the time of receipt of said received reflected energy signal for locating the position of the image segment displayed on each of said display portions relative to a reference position for said energy impulse, so that the rate of propogation of the energy impulse to and from the object is represented by the rate of change of location of the image segment on each of the display portions,
    said image position locating means locating said image segment in opposite directions from said reference signal position on each of said portions so that complementary visual representations which may be combined to form a three-dimensional representation are displayed on said first and second display portions.

2. The system of claim 1, wherein said scanning means includes a directional piezoelectric crystal for transmitting a short pulse of ultrasonic energy and a plurality of receiving piezoelectric crystals equiangularly spaced with respect to said transmitting crystal for receiving reflected signals.

3. A system as claimed in claim 1, including means for sectoring said scanning means across the surface of said object,
    said display means including said first and second portions each of which displays all of said image segment, said image locating means coordinating the image segment display on said portions with the motion of said sectoring means so that the combination of said image on said portions represents three-dimensionally the reflections from said object.

4. The system of claim 1, wherein said energy impulses are ultrasonic and said scanning means comprises a single transducer which received reflected pulses during the intervals in which it is not transmitting pulses.

5. A system as claimed in claim 3, including means for recording the image segments representing reflected signals appearing on said first and second portions over a period of time to produce a record of said three-dimensional representation.

6. The system of claim 3 wherein said sectoring means includes stepping means for effecting horizontal movement of said scanning means, and rotating means for moving said scanning means in a vertical oscillating pattern, so that said object is scanned in sectors.

7. A system as claimed in claim 6, wherein said sectoring means is reversible so that scanning takes place in both horizontal directions of movement of the scanning means across the object.

8. The system of claim 2, wherein said impulses are ultrasonic, and wherein said rotating means mounts said sectoring means for rotation about an axis and includes constantly rotating means; cam means coupled to said constantly rotating means said cam means including guide means; follower means coupled with said guide means so that said follower oscillates as said cam means rotates; and means coupling said follower to said scanning means so that scanning means moves in a vertical oscillating pattern.

9. A system as claimed in claim 6, wherein said display means comprise first and second cathode ray tubes whose screens comprise said first and second display portions, and said image locating means includes readout means including first and second potentiometers directly coupled to each of said stepping means and rotating means for effecting horizontal and vertical movement for developing a first signal output indicative of the horizontal sectoring motion of said scanning means, and for developing a second signal output indicative of the vertical sectoring motion of said scanning means, said first and second signal outputs being applied to first and second deflection assemblies of each of said cathode ray tubes to coordinate the movement of the scanning beams of said cathode ray tubes with the motion of said scanning means.

10. The system of claim 9, wherein said energy impulses are ultrasonic and said scanning means comprises a piezoelectric crystal having a diameter which is large in comparison to the wavelength of said ultrasonic energy.

11. The system of claim 3, wherein said energy impulses are ultrasonic and said scanning means comprises a a single transducer which receives reflected pulses during the intervals in which it is not transmitting pulses.

12. A system as claimed in claim 11, including means for recording the image segments representing reflected signals appearing on said first and second display portions over a period of time to produce a record of said three-dimensional representation.

13. The system of claim 3, wherein said reference time means include means for establishing a reference time for receipt of a reflection of said transmitted scanning signal from the surface of object based on the time of transmission of said signal.

14. A system as claimed in claim 13, wherein said energy impulses are ultrasonic.

15. A system as claimed in claim 14, wherein said display means comprise a programmed gain amplifier having an initial value of amplification and gain ramp generator means responsive to said reference time means for controllably increasing the gain applied by said programmed amplifier to said received reflected energy signal substantially in proportion to the interval between the time of receipt of said reference surface signal and the time receipt of said reflected energy signal so that the intensity of said image segment is substantially independent of reflection distance.

16. A system as claimed in claim 15, wherein said gain ramp means are responsive to said reference time means detection of said surface reflected signal for initiating said increasing gain program, said gain ramp means restoring said programmed amplifier to said initial amplification value after a time interval long enough to allow for reflected signal return from the furthest part of said object.

17. A system as claimed in claim 16, wherein said display means comprise first and second cathode ray tubes whose screens comprise said first and second display portions and said image locating means comprise readout means for developing a first signal output indicative of the horizontal sectoring motion of said scanning means, and for developing a second signal output indicative of the vertical sectoring motion of said scanning means, said first and second signal outputs being applied to first and second deflection assemblies of each of said cathode ray tubes to coordinate the movement of the scanning beams of said cathode ray tubes with the motion of said scanning means.

18. The system of claim 17, wherein said scanning means is coupled to the intensity controls of said cathode ray tubes so that the intensity of the image segments on said cathode ray tubes screens increase in response to receipt of said received energy impulse.

19. A system as claimed in claim 16, including means for recording the image segments representing reflected energy impulses appearing on said first and second display portions over a period of time to produce a record of said three-dimensional representation.

20. A system as claimed in claim 10, wherein said system is ultrasonic and wherein said first and second display portions comprise the screens of first and second cathode ray tubes, each of said tubes including a scanning beam for displaying said image segments on said cathode ray tube screen and first and second voltage deflection assemblies, said image locating means comprising said deflection assemblies of said tube.

21. A system as claimed in claim 20, wherein said image locating means comprise readout means for developing a first signal output indicative of the horizontal sectoring motion of said scanning means, and for developing a second signal output indicative of the vertical sectoring motion of said scanning means, said first and second signal outputs being applied to the first and second deflection assemblies of said cathode ray tubes to coordinate the movement of the scanning beams of said cathode ray tubes with the motion of said scanning means.

22. A system as claimed in claim 21, wherein said image locating means includes a positive high frequency mini-scan sweep control voltage source cooperating with said first deflection assembly of said first cathode ray tube and a negative high frequency mini-scan sweep control voltage source cooperating with said first deflection assembly of said second cathode ray tube, a mini-scan sweep being initiated for each of said transmitted energy impulses, so that the location of the image segment displayed during a mini-scan sweep represents the depth within said object at which said energy impulse is reflected.

23. A system as claimed in claim 22, wherein said reference time means are coupled to said scanning means to establish a reference time for receipt of a reflection of said transmitted scanning signal from the surface of said object based on the time of transmission of said signal, and wherein said display means comprises a programmed gain amplifier having an initial value of amplification and gain ramp generator means responsive to said reference time means for controllably increasing the gain applied by said programmed amplifier to said received reflected energy signal substantially in proportion to the interval between the time of said reference surface signal and the time of receipt of said reflected energy signal so that the intensity of said image segments is substantially independent of reflection distance.

24. A system as claimed in claim 23, wherein said gain ramp means are responsive to said reference time means detection of said surface reflected signal for initiating said increasing gain program, said gain ramp means restoring said programmed amplifier to said initial amplification value after a time interval long enough to allow for signal return from the farthest part of said object.

25. The system of claim 22, wherein the output from said scanning means for receiving is applied to the intensity controls of said cathode ray tubes so that the intensity of the image segments on said cathode ray tubes screens increase in response to said reflected signals.

26. The system of claim 22, wherein said scanning means comprises a single transducer which receives reflected pulses during the intervals in which it is not transmitting pulses.

27. A system as claimed in claim 26, including means for recording the image segments representing reflected signals appearing on said first and second screens over a period of time to produce a record of said three-dimensional representation.

28. The system of claim 3, wherein said scanning means is a single transducer for transmitting short pulses of ultrasonic energy and receiving reflected pulses during the intervals in which it is not transmitting pulses.

29. The system of claim 28, wherein said transducer is a piezoelectric crystal.

30. The system of claim 29, including a pulse blocking circuit comprising pulse generation means and an oscillator, the frequency of said oscillator being such that the wavelength exceed the time required to receive the last reflected signal, the output of said oscillator actuating said pulse generator means, the transmitted output of said scanning means being dependent upon the output of said pulse generating means.

31. The system of claim 30, wherein said pulse generating means generates a start pulse which is about 1/10 microsecond in duration.

* * * * *